US009300525B2

(12) United States Patent
Beattie, Jr. et al.

(10) Patent No.: US 9,300,525 B2
(45) Date of Patent: Mar. 29, 2016

(54) METHOD AND SYSTEM TO IDENTIFY A SOURCE OF SIGNAL IMPAIRMENT

(75) Inventors: James Gordon Beattie, Jr., Bergenfield, NJ (US); Edward Marsh, Sunnyvale, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 582 days.

(21) Appl. No.: 12/829,995

(22) Filed: Jul. 2, 2010

(65) Prior Publication Data

US 2012/0005331 A1      Jan. 5, 2012

(51) Int. Cl.
*G06F 15/16*     (2006.01)
*H04L 12/24*     (2006.01)
*H04L 12/28*     (2006.01)
*H04M 3/30*      (2006.01)
*H04L 29/06*     (2006.01)
*H04M 11/06*     (2006.01)

(52) U.S. Cl.
CPC .......... *H04L 41/065* (2013.01); *H04L 12/2889* (2013.01); *H04L 41/0672* (2013.01); *H04L 65/80* (2013.01); *H04M 3/304* (2013.01); *H04M 11/062* (2013.01)

(58) Field of Classification Search
CPC .............. H04L 41/065; H04L 12/2889; H04L 41/0672
USPC .......................................................... 709/224
See application file for complete search history.

(56) References Cited

U.S. PATENT DOCUMENTS

| 5,585,859 | A | 12/1996 | Ward et al. |
| 5,799,244 | A | 8/1998 | Matsumoto |
| 5,867,096 | A | 2/1999 | Park |
| 6,240,195 | B1 | 5/2001 | Bindner et al. |
| 6,310,911 | B1 | 10/2001 | Burke et al. |
| 6,392,992 | B1 | 5/2002 | Phelps |
| 6,523,233 | B1 | 2/2003 | Wang et al. |
| 6,674,898 | B2 | 1/2004 | Herman |
| 6,816,545 | B1 | 11/2004 | Davis et al. |
| 6,839,382 | B1 | 1/2005 | Davis et al. |
| 7,031,400 | B2 | 4/2006 | Warke et al. |
| 7,123,141 | B2 * | 10/2006 | Contestabile ...... G08B 21/0269 340/539.1 |
| 7,136,421 | B2 | 11/2006 | Lin et al. |
| 7,191,230 | B1 * | 3/2007 | Chakravarti .......... H04L 41/147 709/224 |
| 7,209,859 | B2 * | 4/2007 | Zeif .................... G05B 23/0267 700/108 |
| 7,383,050 | B2 * | 6/2008 | Kall ........................ H04W 8/10 342/357.43 |
| 7,489,660 | B2 | 2/2009 | Min |
| 7,522,904 | B1 * | 4/2009 | Zhu ..................... H04L 12/2898 370/338 |
| 7,598,761 | B2 | 10/2009 | Yasuda |
| 7,616,900 | B2 | 11/2009 | Isomura et al. |
| 7,742,393 | B2 * | 6/2010 | Bonicatto ................ H04B 3/54 340/12.37 |
| 7,760,817 | B2 | 7/2010 | Lin |
| 7,924,737 | B2 | 4/2011 | Yamauchi |

(Continued)

*Primary Examiner* — Karen Tang
(74) *Attorney, Agent, or Firm* — Jackson Walker L.L.P.

(57) ABSTRACT

A method and system for managing performance of over a multimedia content distribution network (MCDN), such as a digital subscriber line network, involves receiving an indication of an impairment in network performance from an MCDN client. The MCDN node associated with the client may be identified and a community of MCDN clients coupled to the MCDN node may be further identified. Impairment information, representative of MCDN equipment, may be collected for each of the MCDN clients. Detailed network diagnostics and field service may be performed for MCDN clients based on a characterization of the impairment parameters. After remediation of the MCDN node, collection of the impairment information may be terminated.

16 Claims, 7 Drawing Sheets

(56) References Cited

U.S. PATENT DOCUMENTS

| | | | |
|---|---|---|---|
| 7,954,010 B2 | 5/2011 | Beattie, Jr. et al. | |
| 7,991,044 B1 | 8/2011 | Brown et al. | |
| 8,018,860 B1* | 9/2011 | Cook | H04L 41/145 370/218 |
| 8,185,060 B2* | 5/2012 | Agashe et al. | 455/69 |
| 2002/0080372 A1 | 6/2002 | Herman | |
| 2002/0163972 A1 | 11/2002 | Warke et al. | |
| 2003/0031263 A1 | 2/2003 | Lin et al. | |
| 2003/0108042 A1* | 6/2003 | Skillicorn et al. | 370/389 |
| 2003/0165340 A1* | 9/2003 | Jayaram et al. | 398/9 |
| 2003/0185173 A1 | 10/2003 | Min | |
| 2004/0098230 A1* | 5/2004 | Richard | H04L 12/24 702/186 |
| 2005/0091356 A1* | 4/2005 | Izzo | H04L 41/0604 709/223 |
| 2005/0169184 A1* | 8/2005 | Murgatroyd et al. | 370/241 |
| 2005/0201758 A1 | 9/2005 | Isomura et al. | |
| 2005/0251858 A1* | 11/2005 | DelRegno | H04M 3/301 726/22 |
| 2005/0276217 A1* | 12/2005 | Gadgil | H04L 45/28 370/225 |
| 2006/0040711 A1* | 2/2006 | Whistler | H04W 24/00 455/566 |
| 2007/0121520 A1* | 5/2007 | Shrikhande | H04L 12/2697 370/252 |
| 2007/0222576 A1* | 9/2007 | Miller | H04L 41/0609 340/506 |
| 2007/0230364 A1 | 10/2007 | Yamauchi | |
| 2007/0288629 A2* | 12/2007 | Taylor | G03G 15/5075 709/224 |
| 2008/0009238 A1 | 1/2008 | Harris | |
| 2008/0031135 A1* | 2/2008 | Pok | H04L 41/0893 370/235 |
| 2008/0037684 A1 | 2/2008 | Lin | |
| 2008/0039895 A1 | 2/2008 | Fowler et al. | |
| 2008/0123786 A1* | 5/2008 | Wongwirawat et al. | 375/346 |
| 2008/0123787 A1* | 5/2008 | Wongwirawat et al. | 375/346 |
| 2008/0123788 A1* | 5/2008 | Wongwirawat et al. | 375/348 |
| 2008/0159154 A1* | 7/2008 | Bajpay | H04L 69/40 370/245 |
| 2008/0220784 A1* | 9/2008 | Somasundaram | H04W 36/0083 455/437 |
| 2008/0256397 A1* | 10/2008 | Smith | G06F 11/008 714/47.3 |
| 2008/0263615 A1* | 10/2008 | Kashihara | H04L 41/0677 725/127 |
| 2008/0268861 A1* | 10/2008 | Buracchini et al. | 455/452.1 |
| 2009/0143871 A1* | 6/2009 | Gao et al. | 700/29 |
| 2009/0154385 A1* | 6/2009 | Makhija et al. | 370/311 |
| 2009/0161530 A1* | 6/2009 | Yang et al. | 370/216 |
| 2009/0184835 A1* | 7/2009 | Deaver et al. | 340/660 |
| 2009/0187284 A1* | 7/2009 | Kreiss et al. | 700/291 |
| 2009/0187285 A1* | 7/2009 | Yaney et al. | 700/292 |
| 2009/0187958 A1* | 7/2009 | Reibman et al. | 725/116 |
| 2009/0222553 A1* | 9/2009 | Qian | H04L 12/2602 709/224 |
| 2009/0228941 A1* | 9/2009 | Russell et al. | 725/107 |
| 2009/0300173 A1* | 12/2009 | Bakman et al. | 709/224 |
| 2009/0316880 A1 | 12/2009 | Michaelis | |
| 2009/0319656 A1 | 12/2009 | Yang et al. | |
| 2010/0054140 A1* | 3/2010 | Stjernholm | H04L 43/10 370/252 |
| 2010/0097940 A1* | 4/2010 | Asefa et al. | 370/245 |
| 2010/0111277 A1 | 5/2010 | Griesmer et al. | |
| 2010/0115605 A1 | 5/2010 | Beattie et al. | |
| 2010/0149989 A1 | 6/2010 | Beattie, Jr. et al. | |
| 2010/0149999 A1 | 6/2010 | Beattie, Jr. et al. | |
| 2010/0150018 A1 | 6/2010 | Beattie, Jr. et al. | |
| 2010/0153785 A1* | 6/2010 | Keromytis et al. | 714/38 |
| 2010/0153787 A1 | 6/2010 | Beattie, Jr. et al. | |
| 2010/0161827 A1* | 6/2010 | Griesmer et al. | 709/232 |
| 2010/0306014 A1* | 12/2010 | Chow | G06Q 10/0635 705/7.28 |
| 2010/0318934 A1* | 12/2010 | Blevins et al. | 715/772 |
| 2011/0047273 A1* | 2/2011 | Young, Jr. | G06F 17/30557 709/226 |
| 2011/0051904 A1 | 3/2011 | Triano et al. | |
| 2011/0055884 A1 | 3/2011 | Beattie, Jr. et al. | |
| 2011/0081897 A1* | 4/2011 | Beattie, Jr. | H04W 24/02 455/418 |
| 2011/0082926 A1 | 4/2011 | Triano et al. | |
| 2011/0103231 A1* | 5/2011 | Beattie et al. | 370/241 |
| 2011/0106588 A1 | 5/2011 | Beattie, Jr. et al. | |
| 2011/0122246 A1 | 5/2011 | Beattie, Jr. et al. | |
| 2011/0122768 A1 | 5/2011 | George et al. | |
| 2011/0126241 A1 | 5/2011 | Beattie, Jr. et al. | |
| 2011/0136486 A1 | 6/2011 | Beattie, Jr. et al. | |
| 2011/0145365 A1 | 6/2011 | Beattie, Jr. et al. | |
| 2011/0159804 A1 | 6/2011 | Petruzzelli et al. | |
| 2011/0182575 A1 | 7/2011 | Kuczynski et al. | |
| 2011/0270550 A1* | 11/2011 | Kreiss et al. | 702/60 |
| 2012/0008821 A1* | 1/2012 | Sharon et al. | 382/100 |
| 2012/0046891 A1* | 2/2012 | Yaney et al. | 702/62 |
| 2012/0057456 A1* | 3/2012 | Bogatin et al. | 370/230.1 |
| 2012/0083917 A1* | 4/2012 | Zhou et al. | 700/110 |

* cited by examiner

METHOD AND SYSTEM TO IDENTIFY A SOURCE OF SIGNAL IMPAIRMENT

FIELD OF THE DISCLOSURE

The present disclosure relates to managing network performance and, more particularly, to identifying sources of signal impairment in a multimedia content distribution network (MCDN).

BACKGROUND

Description of the Related Art

Network service provided via an MCDN may be subject to signal impairment. The signal impairment may result in degraded performance that adversely affects end-user experience of multimedia content. The signal impairment may originate from various sources. The quality control systems of an MCDN service provider may be based on a reactive approach to managing network performance for isolated incidents.

DESCRIPTION OF THE EXEMPLARY EMBODIMENTS

Figure 1:
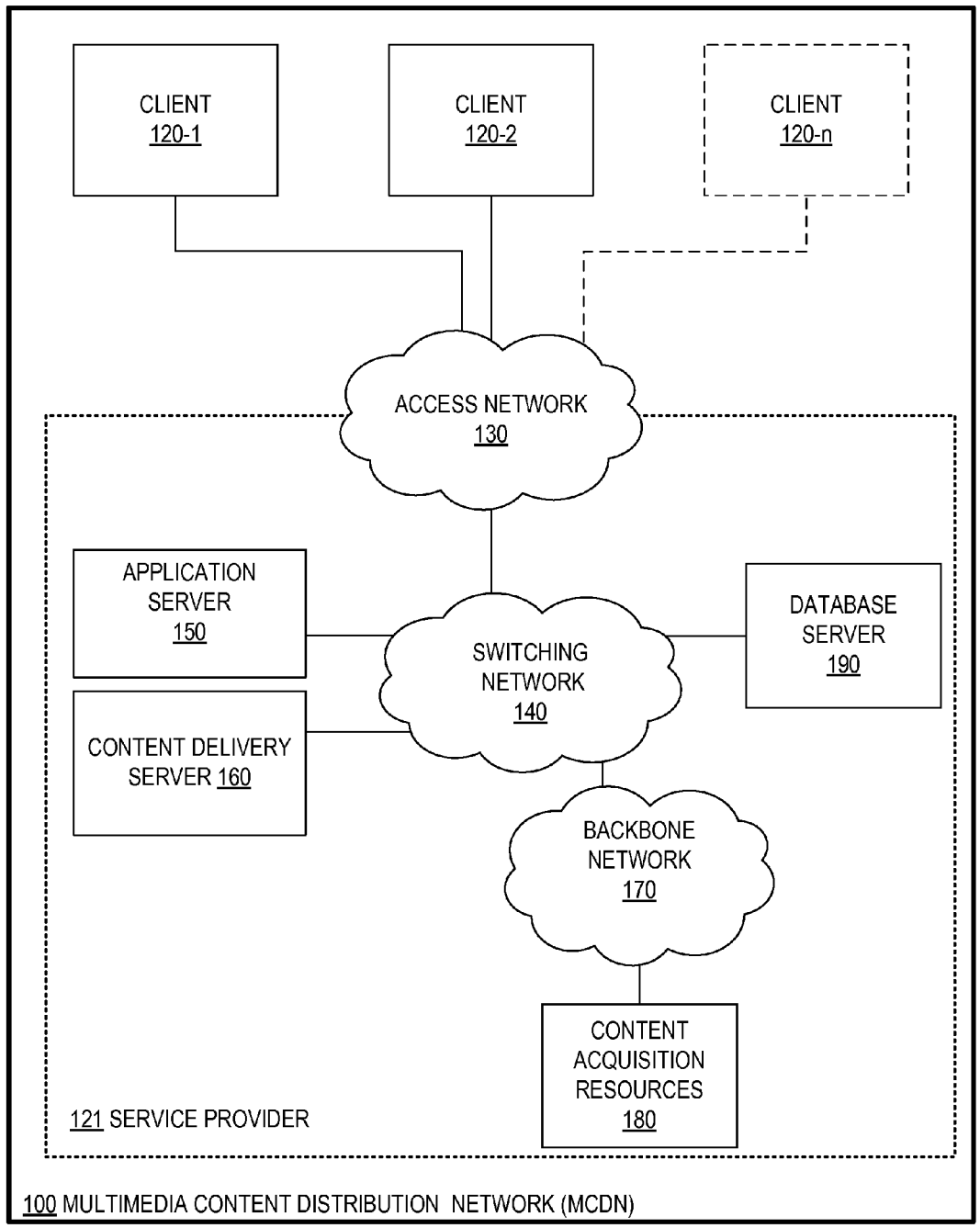
FIG. 1 is a block diagram of selected elements of an embodiment of an MCDN.

In one aspect, a disclosed method for managing performance of an MCDN includes identifying a local MCDN node serving a first MCDN client system in response to receiving an indication from the first MCDN client system of an impairment in MCDN performance. The method may further include identifying a community of MCDN client systems served by the local MCDN node, including the first MCDN client system, characterizing the MCDN client systems in the community based on an impairment parameter, and identifying candidate MCDN client systems in the community based on said characterizing. The method may still further include performing network diagnostics on the identified candidate MCDN client systems to predict a source of the impairment in MCDN performance.

In given embodiments, the method may further include determining whether the predicted source of the impairment in MCDN performance is electromagnetically coupled to the first MCDN client system. The determining operation may be based on the network diagnostics. The indication of the impairment in MCDN performance may be a service request to an MCDN network provider. The impairment parameter may describe customer premises equipment (CPE) respectively associated with each of the community of MCDN client systems. The impairment parameter may be a number of reinitializations of a gateway respectively associated with each of the community of MCDN client systems. The impairment may be associated with digital subscriber line (DSL) service provided to the first MCDN client via a galvanic loop from the MCDN node. The predicted source of the impairment may be a second MCDN client system different from the first MCDN client system. The method operation of performing network diagnostics may include determining where the first MCDN client system and the second MCDN client system share proximate network connections.

In a further aspect, a disclosed computer system for monitoring an MCDN includes a processor having access to memory media. The memory media may include instructions executable by the processor to receive an indication from a first MCDN client of an MCDN impairment, identify a plurality of MCDN clients sharing an MCDN node with the first MCDN client, generate a performance profile for each of the plurality of MCDN clients, and analyze the performance profile to determine impairment rankings within the plurality of MCDN clients.

In certain embodiments, the memory media may further include processor instructions to identify a second MCDN client included in the plurality of MCDN clients as a probable contributor to the MCDN impairment. The processor instructions to identify may be executed based on the impairment rankings. The second MCDN client may be different from the first MCDN client. The MCDN impairment may be associated with DSL service provided via the MCDN node. The performance profile may include a CPE parameter obtained by querying CPE of a respective MCDN client. The CPE parameter may be a number of reinitializations of a gateway associated with the respective MCDN client. The impairment rankings may be used to identify MCDN clients that are probable contributors to the MCDN impairment based on at least one of: a threshold value of the CPE parameter, a percentage of the plurality of MCDN clients, a predetermined MCDN quality parameter, and a number of MCDN clients. The processor instructions executable to analyze the performance profile may further be executable to determine, based on the impairment rankings, that the MCDN node is operating normally. Responsive to determining that the MCDN node is operating normally, the processor instructions to analyze the performance profile may also be executable to stop generating the performance profiles. The processor instructions executable to identify the plurality of MCDN clients may be executed when an MCDN uplink associated with the first MCDN client is operating normally. The performance profile may include an MCDN node parameter obtained by querying the MCDN node.

In yet another aspect, a disclosed computer-readable memory media includes executable instructions for monitoring an MCDN. The instructions may be executable to receive an indication from a first MCDN client of an impairment in MCDN performance. The first MCDN client may be one of a community of MCDN clients associated with an MCDN node. The instructions may further be executable to generate rankings for the MCDN clients in the community based on an impairment parameter, predict a source of the impairment in MCDN performance based on the rankings, and initiate network service to determine the extent to which the predicted source of the impairment in MCDN performance is coupled to the first MCDN client system.

In particular embodiments, the predicted source of the impairment may be associated with a second MCDN client different from the first MCDN client. The MCDN impairment may be associated with DSL service provided via the MCDN node. The MCDN node may be a DSL access multiplexer (DSLAM) including line termination cards having ports respectively configured to provide DSL service to an MCDN client. The impairment parameter may be associated with CPE for each of the community of MCDN clients, while the memory media may include executable instructions to query the CPE to obtain the impairment parameter for the community of MCDN clients. The memory media may still further include instructions to record a performance profile for each of the plurality of MCDN clients, the performance profile including at least one impairment parameter. The impairment parameter may be recorded at the MCDN node, while the memory media may further include instructions to query the MCDN node to obtain the impairment parameter for each of the plurality of MCDN clients.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be any number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital connections between clients 120 and a node (see also FIG. 4) in access network 130 while fiber, cable or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include DSL connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 and/or access network 130 may include elements of a DSLAM that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Figure 2:
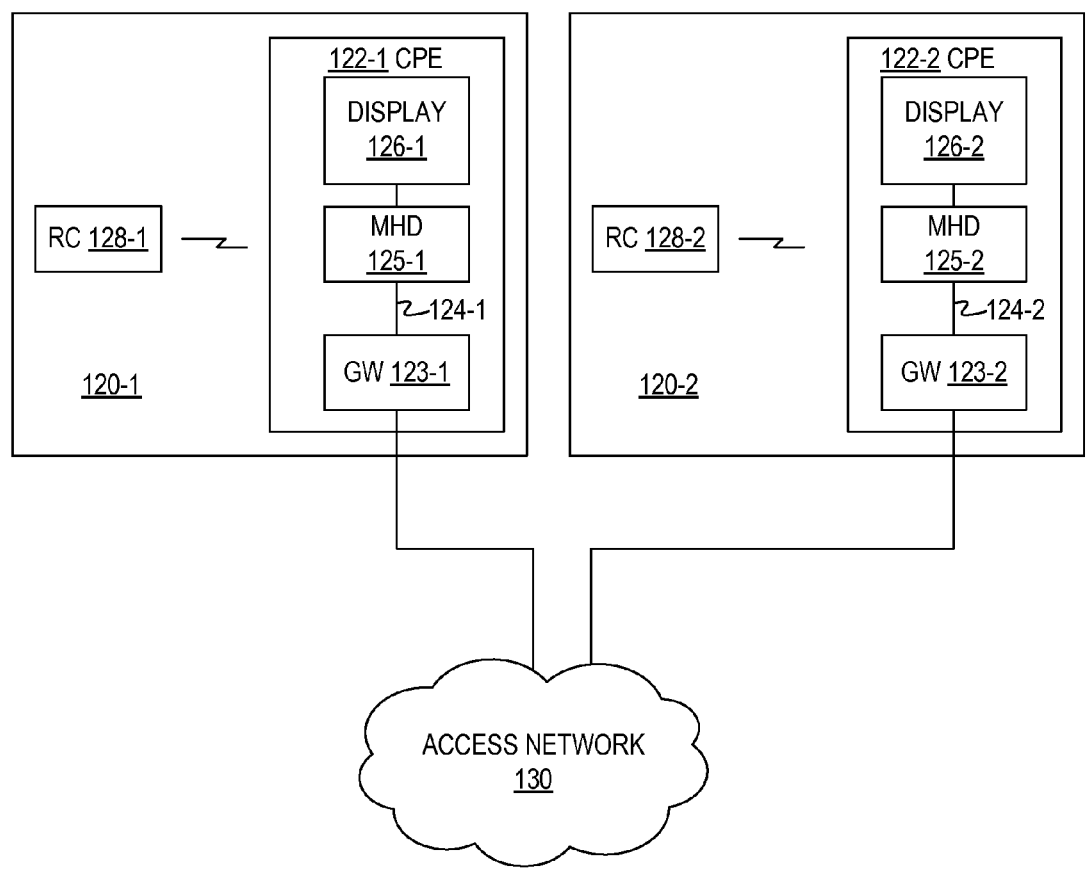
FIG. 2 is a block diagram of selected elements of an embodiment of an MCDN.

Turning now to FIG. 2, clients 120 are shown in additional detail with respect to access network 130. Clients 120 may include a network appliances collectively referred to herein as CPE 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 may be operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a device that is configured to control multiple pieces of equipment. When the equipment controlled by remote control 128 changes, remote control 128 may be reprogrammed, for example, to add a new device. Remote control 128 may be programmed using a local transceiver (see FIG. 3) coupled to CPE 122.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based multimedia content delivery network.

Figure 3:
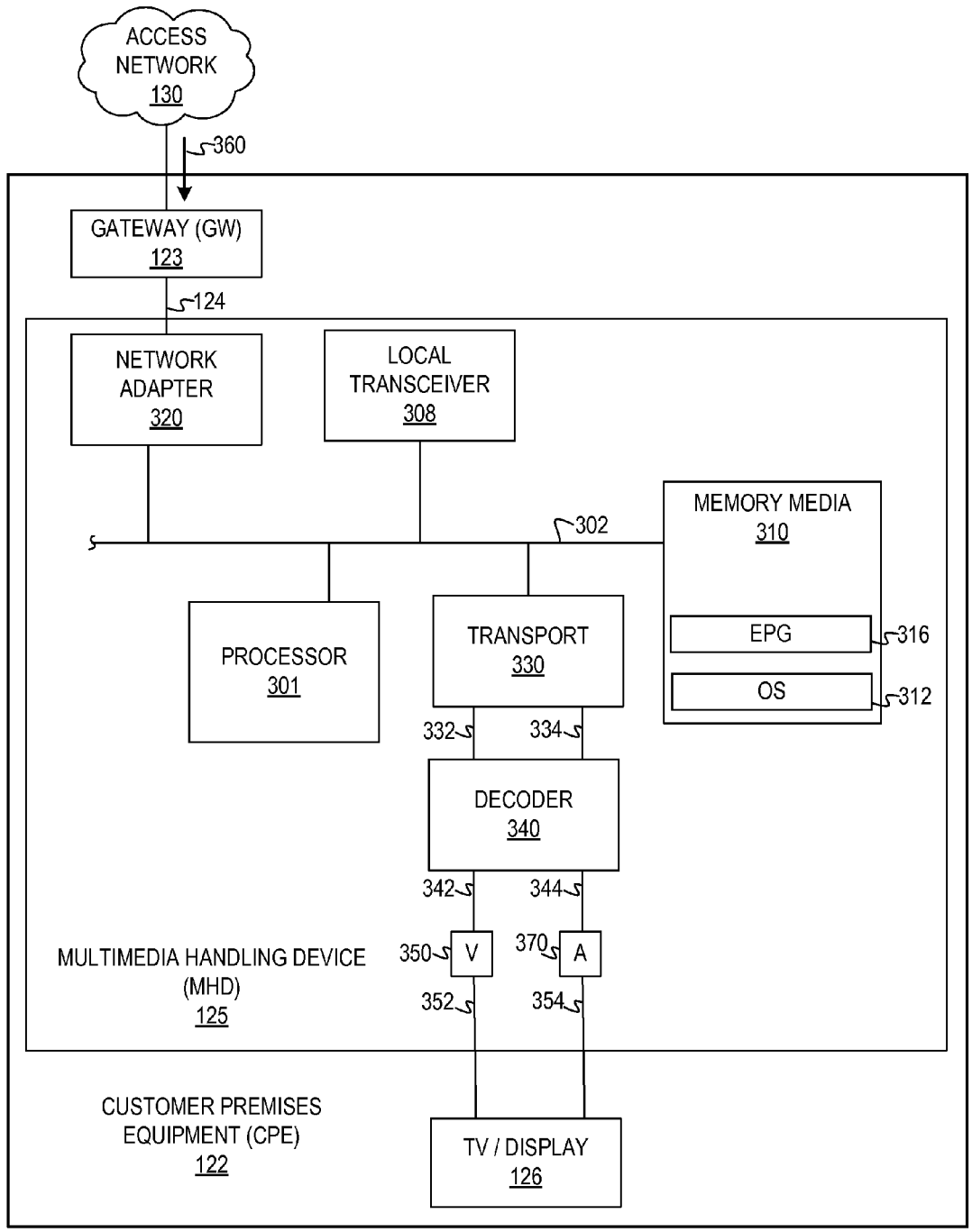
FIG. 3 is a block diagram of selected elements of an embodiment of a multimedia handling device (MHD)

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media, collectively identified as memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Memory media 310 encompasses persistent and volatile media, fixed and removable media, and magnetic and semiconductor media. Memory media 310 is operable to store instructions, data, or both. Memory media 310 as shown may include sets or sequences of instructions, namely, an operating system 312, and EPG 316. Operating system 312 may be a UNIX or UNIX-like operating system, a Windows® family operating system, or another suitable operating system. In some embodiments, memory media 310 is configured to store and execute instructions provided as services to client 120 by application server 150, as mentioned previously.

EPG 316 represents a guide to the multimedia content provided to client 120 via MCDN 100, and may be shown to the user as an element of a user interface. The user interface may include a plurality of menu items arranged according to one or more menu layouts, which enable a user to operate MHD 125. The user may operate the user interface, including EPG 316, using remote control 128 (see FIG. 2).

Local transceiver 308 represents an interface of MHD 125 for communicating with external devices, such as remote control 128, or another remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by an remote control module (not shown in FIG. 3) for providing remote control functionality.

Figure 4:
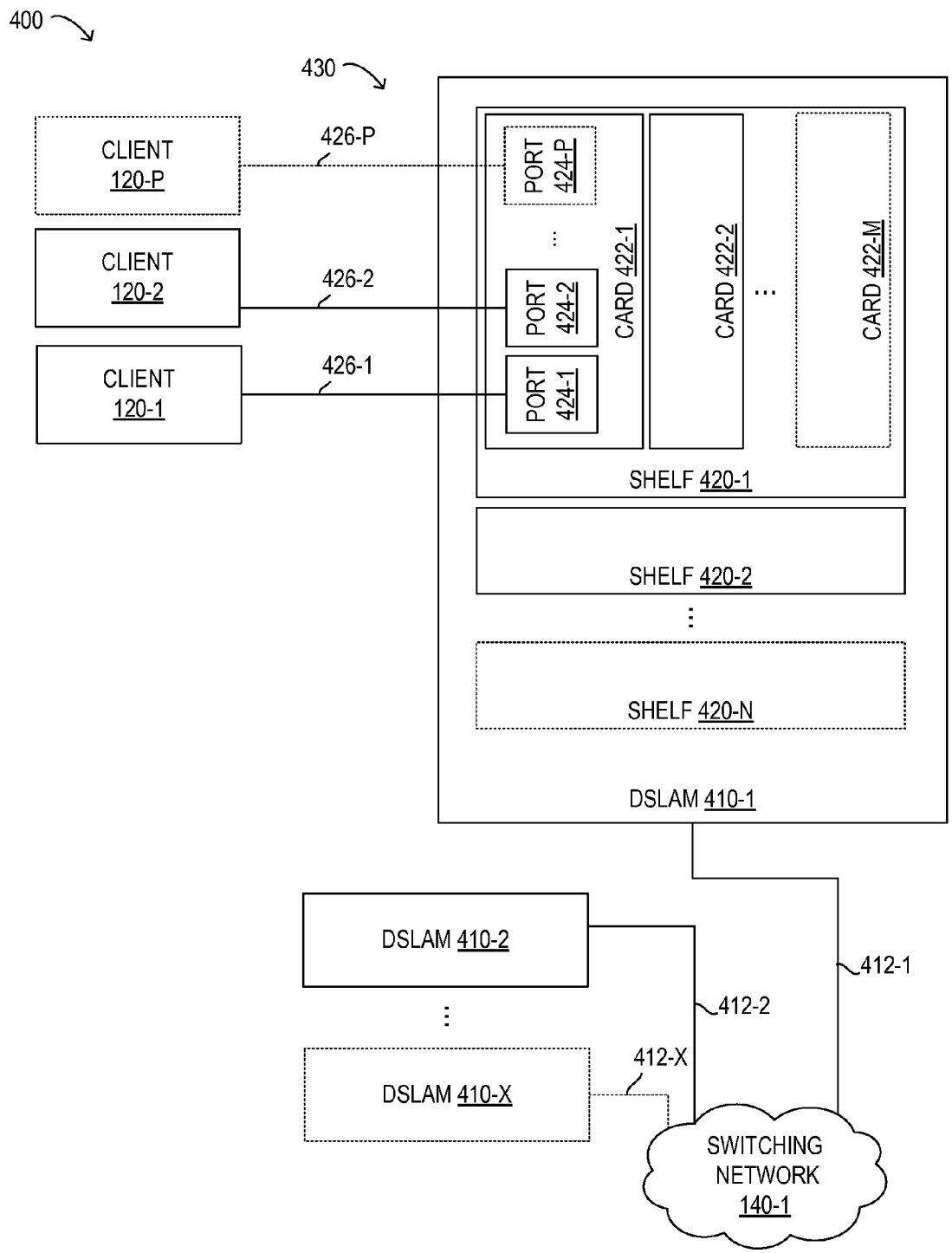
FIG. 4 is a block diagram of selected elements of an embodiment of an MCDN.

Turning now to FIG. 4, a block diagram of selected elements of an embodiment of MCDN 400 is depicted. In MCDN 400, selected elements of one embodiment of access network 430 are depicted in further detail. Access network 430 is shown implementing a DSL architecture, which may represent any of a number of different DSL technologies, such as Asymmetric DSL (ADSL), Very High Speed DSL (VDSL), VDSL2, and other variants thereof, among others. In certain embodiments, access network 430 represents access network 130 (see FIG. 1). It is noted that like numbered elements in FIG. 4 represent components discussed above with respect to FIGS. 1-3.

As shown in FIG. 4, MCDN 400 includes switching network 140-1, which may be one instance, segment, or portion of switching network 140 (see FIG. 1). For example, switching network 140-1 may represent elements of switching network 140 providing MCDN service to a particular geographic region or area. As discussed above with respect to FIG. 1, switching network 140-1 represents infrastructure of MCDN service provider 121, which may correspond to the provider's central office, from where network service for a particular MCDN segment is provided. Accordingly, switching network 140-1 is shown with network termination (NT) links 412 (also referred to as uplinks) to a respective plurality of DSLAMs 410. Specifically, NT link 412-1 provides an uplink for DSLAM 410-1, NT link 412-2 provides an uplink for DSLAM 410-2, and so on for a plurality of uplinks, up to NT link 412-X for DSLAM 410-X, where X represents a number of DSLAMs 410 which are uplinked to switching network 140-1. Each individual DSLAM 410 may provide service for a certain number of MCDN clients, as will be described in detail below.

In FIG. 4, DSLAM 410-1 is shown in further detail including additional elements, which have been omitted in the depiction of DSLAM 410-2 and 410-X for clarity. It will be understood that DSLAM 410-1 is generally representative for any given DSLAM 410, and that a particular DSLAM 410 may be variously configured with different numbers of elements and sub-elements, as desired. As used herein, DSLAM 410 represents an "MCDN node" or simply "node," while elements included within DSLAM 410 are referred to as an "MCDN sub-node" or "sub-node." NT links 412 thus represent an uplink between an MCDN node serving a given plurality of MCDN clients 120 and switching network 140, representing other portions of MCDN 400 (not shown in FIG. 4, see FIG. 1).

As shown in FIG. 4, DSLAM 410-1 includes a number of shelves 420, shown as shelf 420-1, shelf 420-2, and so on, up to shelf 420-N, where N represents a number of shelves 420 included within DSLAM 410-1. It is noted that different DSLAMs 410 may be equipped with a different number of shelves 420. In FIG. 4, shelf 420-1 is shown in further detail including additional elements, which have been omitted from the depiction of shelf 420-2 and 420-N for clarity. Shelf 420 may generally represent an equipment rack for accommodating a number of cards 422 and may provide a connection bus for terminating, powering, and interconnecting cards 422. DSLAM 410 may further include equipment (not explicitly shown in FIG. 4) for bundling network connections from a plurality of cards 422, also known as line termination (LT) cards, via shelves 420 to at least one NT link 412.

As illustrated in FIG. 4, shelf 420-1 may include representative card 422-1, card 422-2, and so on up to card 422-M, where M represents a number of cards 422 that may be accommodated in shelf 420-1. It is noted that different shelves 420 may accommodate a different number of cards 422. In FIG. 4, card 422-1 is shown in further detail including additional elements, which have been omitted from card 422-2 and card 422-M for clarity. Card 422-1 is shown with a number of ports 424 for providing service to individual MCDN clients 120 via respective LT links 426. LT link 426 may represent a DSL connection (i.e., signal loop) to the premises of client 120. Specifically, port 424-1 is linked to client 120-1 via LT link 426-1, port 424-2 is linked to client 120-2 via LT link 426-2, and so on, up to port 424-P linking client 120-P via LT link 426-P, where P represents a number of ports that card 422-1 is configured to provide. It is noted that LT link 426 may terminate at client 120 via GW 123, such that multimedia content 360 is delivered via LT link 426 (see FIG. 3). Card 422-1 may further include additional elements (not shown in FIG. 4) for providing connections from ports 424 to shelf 420 (for example, via a bus backplane) and ultimately to NT link 412. It is also noted that different cards 422 may be configured with different numbers of ports 424.

In review, the elements of MCDN 400 shown in FIG. 4 represent an MCDN architecture suitable for providing DSL network service to a community of clients 120 via DSLAM 410. A large number of DSLAMs 410 may be installed to provide service to a number of neighborhoods, cities, and other localities. Accordingly, client 120 may be coupled to MCDN 400 via port 424, card 422, shelf 420, and DSLAM 410. The MCDN architecture represented by MCDN 400 may thus allow MCDN service provider 121 (see FIG. 1) to individually address and communicate with nodes, sub-nodes and MCDN clients 120.

The physical implementation of LT link 426 may involve various cabling and termination elements, which may be routed and bundled in a number of different configurations. LT link 426 may thus be exposed to, or come in proximity to, a number of different sources of electromagnetic interference. When LT link 426 represents a galvanic connection, or includes galvanic elements, transmission line effects may increase the susceptibility of LT 426 to environmental noise. Electromagnetic interference resulting in noise may originate from sources internal or external to the MCDN, and may become coupled to an MCDN signal transmitted via LT link 426. When the MCDN signal is degraded (i.e., a signal-to-noise ratio is reduced), this is referred to herein as "signal impairment." In MCDN 400, signal impairment may be introduced to the MCDN signal of a given client 120 via any element in the MCDN architecture, including GW 123, LT link 426, port 424, card 422, shelf 420, DSLAM 410, and other elements (not shown in FIG. 4).

Furthermore, as evident from MCDN 400, clients 120 may have their MCDN signals coupled together through any shared or proximate element in the MCDN architecture where signal impairment is introduced, as noted above. Thus, equipment associated with MCDN client 120-1 may cause signal impairment for a number of other MCDN clients 120. It is noted that a user of MCDN client 120 may experience a degradation network performance that may be the result of signal impairment or another cause. Other causes of network degradation may include upstream issues, such as, but not limited to: equipment failure within DSLAM 410, network traffic congestion at DSLAM 410, network traffic congestion at NT link 412, network issues at switching network 140, and other causes.

Service provider 121 (see FIG. 1) may provide various types of support for users of MCDN clients 120 in order to manage performance of MCDN 400 and maintain a desired quality of service. For example, a user of MCDN client 120 may report an issue with network performance to service provider 121 and may request service to remediate a particular network connection. Service provider 121 may then perform network diagnostics to determine a cause of the reported issue. The diagnostics may include assessments of network infrastructure, such as the MCDN architecture described above with respect to MCDN 400. The diagnostics may involve determining whether an issue with NT link 412 has been reported. When NT link 412 has been found to be operating normally, the network diagnostics may then focus on DSLAM 410 providing service to the reporting MCDN client 120. The network diagnostics may attempt to identify whether a signal impairment is associated with the reported issue. In an attempt to locate a source of or a contributor to the signal impairment, a service ticket may be generated, which may result in a network technician to be dispatched on site to client 120 or DSLAM 410.

In instances where a signal impairment affects a number of different clients 120, any one or more of the affected clients 120 may generate service calls. Certain clients 120 that are affected may not generate any service calls. Furthermore, a particular client 120 may be a source or contributor to signal impairment for a community of clients 120, which may not be evident to the affected users or to service provider 121, who is receiving and processing the service calls (see FIG. 1). Thus, when service calls are handled independently of one another, the administration of customer service to clients 120 may result in redundant service tickets and an over-usage of constrained field support resources, without providing any direct benefit to clients 120.

During operation of MCDN 400, a service call may be received from (or on behalf of) MCDN client 120-1, indicating that a user of MCDN client 120-1 is experiencing a degradation in network transmission quality. In response to receiving the service call associated with client 120-1, LT uplink 426-1, port 424-1, card 422-1, shelf 420-1, and DSLAM 410-1 may be identified. It may then be determined that NT uplink 412-1 associated with DSLAM 410-1 is not reporting any performance issues. A community of MCDN clients 120 sharing at least some portion of DSLAM 410-1 (or a sub-node included therein) may be identified. An impairment parameter for each of the community of MCDN clients 120, including the reporting MCDN client 120-1, may then be specified for characterizing the respective network performance provided to the community of MCDN clients 120.

The impairment parameter may be associated with a particular MCDN sub-node included in DSLAM 410-1. In one embodiment, the impairment parameter is associated with a particular shelf 420 or card 422, and is collectively obtained for all representative MCDN clients associated with the particular shelf 410 or card 422. In other embodiments, the impairment parameter is specific to a given MCDN client, such as client 120-1, and is thus correspondingly associated with port 424-1, LT link 426-1, and/or CPE at client 120-1 (i.e., gateway 123 (see FIG. 3)). In certain embodiments, the impairment parameter may be a device parameter associated with a particular network device, such as CPE device or port 424.

In one illustrative embodiment, the impairment parameter may be a reinitialization count for GW 123 included in client 120-1. GW 123 (not shown in FIG. 4, see FIG. 3) may be coupled to port 424-1 via LT link 426-1. When GW 123 is connected and powered on, it may undergo a reinitialization process, including arbitration of network parameters and settings with port 424-1. GW 123 may further be configured to reinitialize when network traffic across LT link 426-1 reaches an abnormal condition. For example, when a signal impairment affects LT link 426-1, causing network traffic to be interrupted, GW 123 may be configured to automatically reinitialize. During reinitialization, certain device or link parameters can be logged by GW 123 and/or port 424-1. A reinitialization counter may further log a number of times GW 123 has been reinitialized since power up, or over a given time window. Thus, when LT link 426-1 is affected by signal impairment, a reinitialization count stored in GW 123 may be larger than when LT link 426-1 is operating normally. A magnitude of the reinitialization count may further be indicative of a severity (e.g., duration, amplitude, frequency, etc.) of the signal impairment or of a proximity of the signal impairment. Fluctuations in the reinitialization count over time may further be correlated with a temporal attribute of the signal impairment. In this manner, relative values for the reinitialization count among the community of MCDN clients 120 may be indicative of a source of the signal impairment, or may be used to determine a contributor to the signal impairment.

After the impairment parameter has been specified, the impairment parameter for each of the community of MCDN clients 120 may be collected. The collection of the impairment parameters may be performed for a period of time to generate a time-stamped series for each of the community of MCDN clients 120. Other values, including at least one impairment parameter, may be collected to generate performance profiles for the community of MCDN clients 120. The performance profiles may then be analyzed. MCDN clients 120 in the community may be characterized based on the impairment parameter. For example, MCDN clients 120 in the community may be ranked according to their respective impairment parameters. Based on the characterization, candidate MCDN clients in the community may be identified. For example, the ranked clients may be filtered based on a threshold value for the impairment parameter, a percentage of clients in the community, relative values for the impairment parameter, or a number of clients, to select the candidate clients. The candidate clients may then be subjected to network diagnostics to predict a source of the signal impairment. The source may be one of the MCDN clients 120 in the community, or may be associated with multiple MCDN clients 120, such as card 422 or shelf 420.

In certain instances, additional information may be used to identify, or predict, a source of the signal impairment. When a piece of equipment external to the MCDN adversely affects MCDN performance, information from other entities may be used to correlate the signal impairment. For example, a defective street light may be the source of electromagnetic impulses that adversely affect a DSL connection. Information from a municipality about street light repairs at locations associated with DSLAMs may be used in correlation with collected impairment parameters, as noted above.

After possible sources or contributors to the signal impairment have been predicted, a field service ticket may result in dispatching a work crew to the associated DSLAM. The service ticket may result in remediation of the DSLAM, or elimination of the source of the signal impairment. After the DSLAM and associated MCDN clients are found to be working normally, the collection of impairment parameters may be terminated. In this manner, computational resources for collecting and storing data may be substantially reduced and focused on those MCDN nodes where abnormal performance is actually observed.

Figure 5:
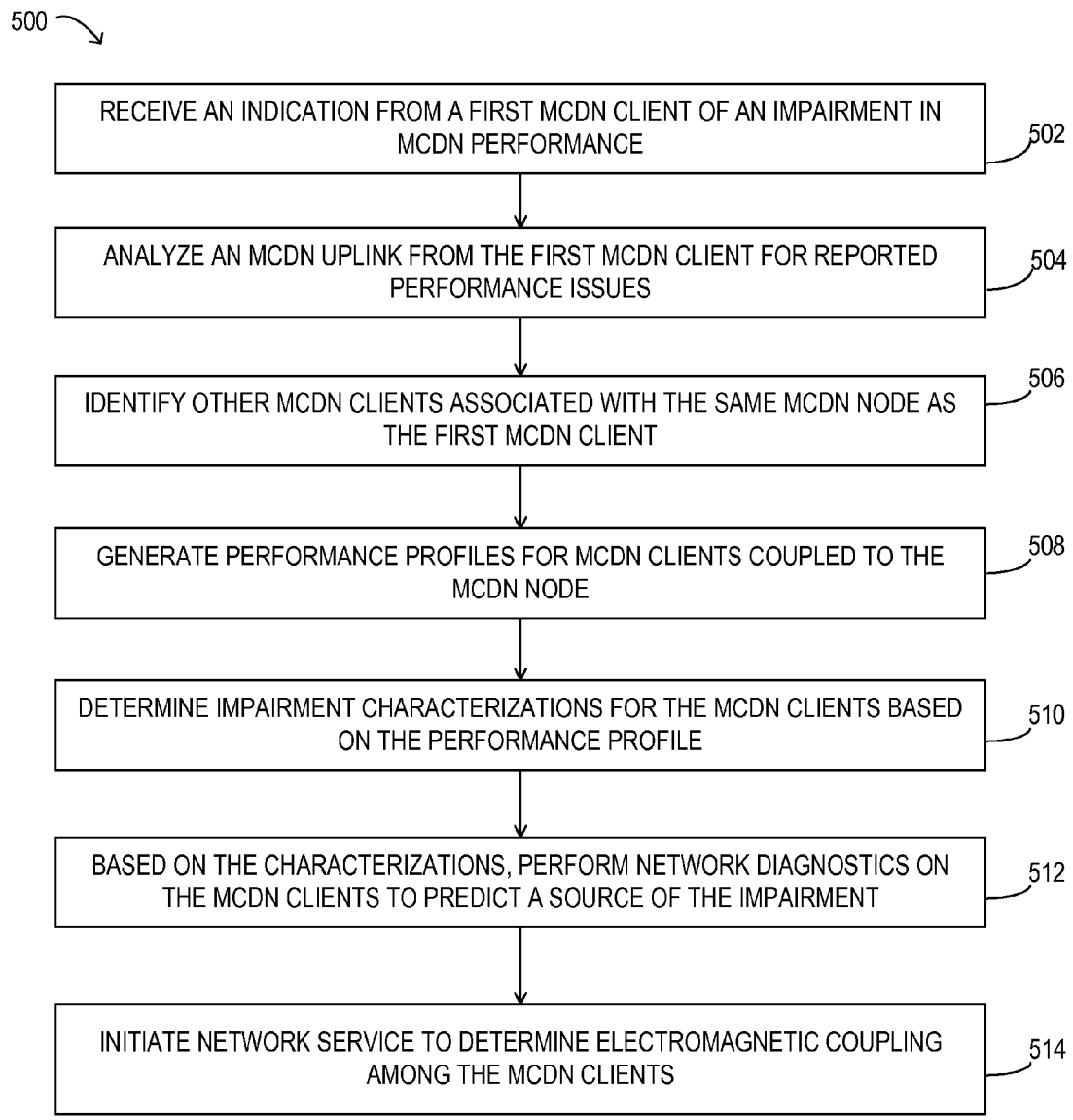
FIG. 5 illustrates an embodiment of a method for identifying sources of signal impairment.

Turning now to FIG. 5, an embodiment of method 500 for managing performance of an MCDN is illustrated in flow chart form. In one embodiment, method 500 may be performed by network performance monitoring and management 710 (see FIG. 7) in conjunction with MCDN 100 and 400 (see FIGS. 1, 4). Method 500 may also involve functionality provided by DSLAM 410 and CPE 122 (see FIGS. 3, 4). It is noted that certain operations described in method 500 may be optional or may be rearranged in different embodiments.

In method 500, an indication of an impairment in MCDN performance may be received from a first MCDN client (operation 502). The indication may be a service request to an MCDN network provider. An MCDN uplink from the first MCDN client may be analyzed for reported performance issues (operation 504). Other MCDN clients associated with the same MCDN node as the first MCDN client may be identified (operation 506). Performance profiles for MCDN clients coupled to the MCDN node may be generated (operation 508). In one embodiment, performance profiles are generated using database server 190 (see FIG. 1). The performance profiles may include impairment information, such as an impairment parameter and/or other information, for the MCDN clients, including the first MCDN client. Impairment characteristics for the MCDN clients based on the performance profile may be determined (operation 510). The characteristics may include ranking and/or filtering based on impairment parameters to select candidate MCDN clients for further operations in method 500. Based on the characterizations, network diagnostics may be performed on the MCDN clients to predict a source of the impairment (operation 512). Network service to determine electromagnetic coupling among the MCDN clients may be initiated (operation 514). The network service may include remediation of the source of network impairment, such as repair of network connections and equipment.

Figure 6:
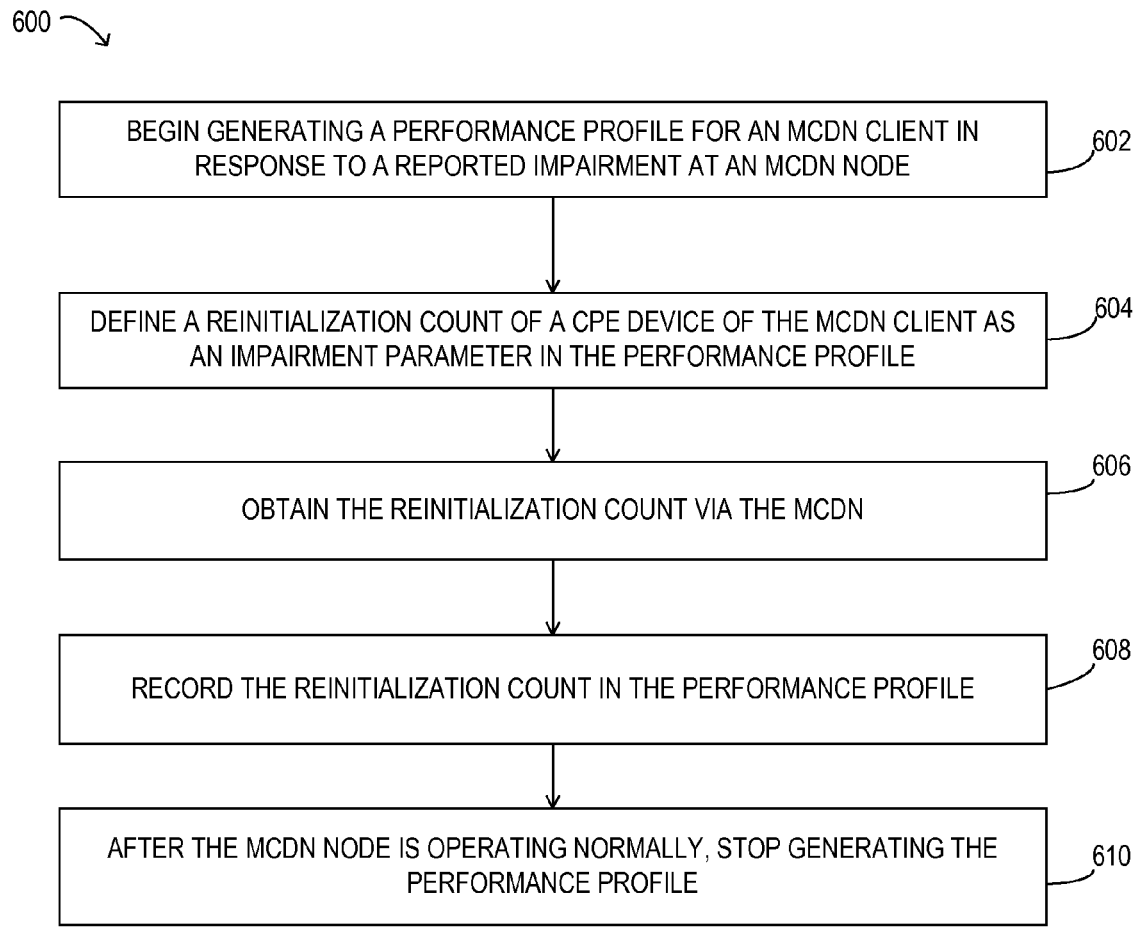
FIG. 6 illustrates an embodiment of a method for identifying sources of signal impairment.

Turning now to FIG. 6, an embodiment of method 600 for managing performance of an MCDN is illustrated in flow chart form. In one embodiment, method 600 may be performed by network performance monitoring and management 710 (see FIG. 7) in conjunction with MCDN 100 and 400 (see FIGS. 1, 4). Method 600 may also involve functionality provided by DSLAM 410 and CPE 122 (see FIGS. 3, 4). It is noted that certain operations described in method 600 may be optional or may be rearranged in different embodiments. It is further noted that while method 600 is described in terms of a single MCDN client, it will be understood that multiple instances of method 600 may be executed, either concurrently or simultaneously or in a combination thereof, for a plurality of MCDN clients and/or MCDN nodes.

Method 600 may begin with generating a performance profile for an MCDN client in response to a reported impairment at an MCDN node (operation 602). A reinitialization count of a CPE device of the MCDN client may be defined as an impairment parameter in the performance profile (operation 604). The CPE device may be a gateway to a DSL connection provided by a DSLAM representing a local MCDN node. The reinitialization count may be obtained via the MCDN (operation 606). The reinitialization count may be obtained by querying the gateway, by querying the DSLAM, or by querying an MCDN sub-node included therein (i.e., a port, a card, or a shelf, etc.). The reinitialization count may be recorded in the performance profile (operation 608). After the MCDN node is operating normally, generation of the performance profile may stop (operation 610).

Figure 7:
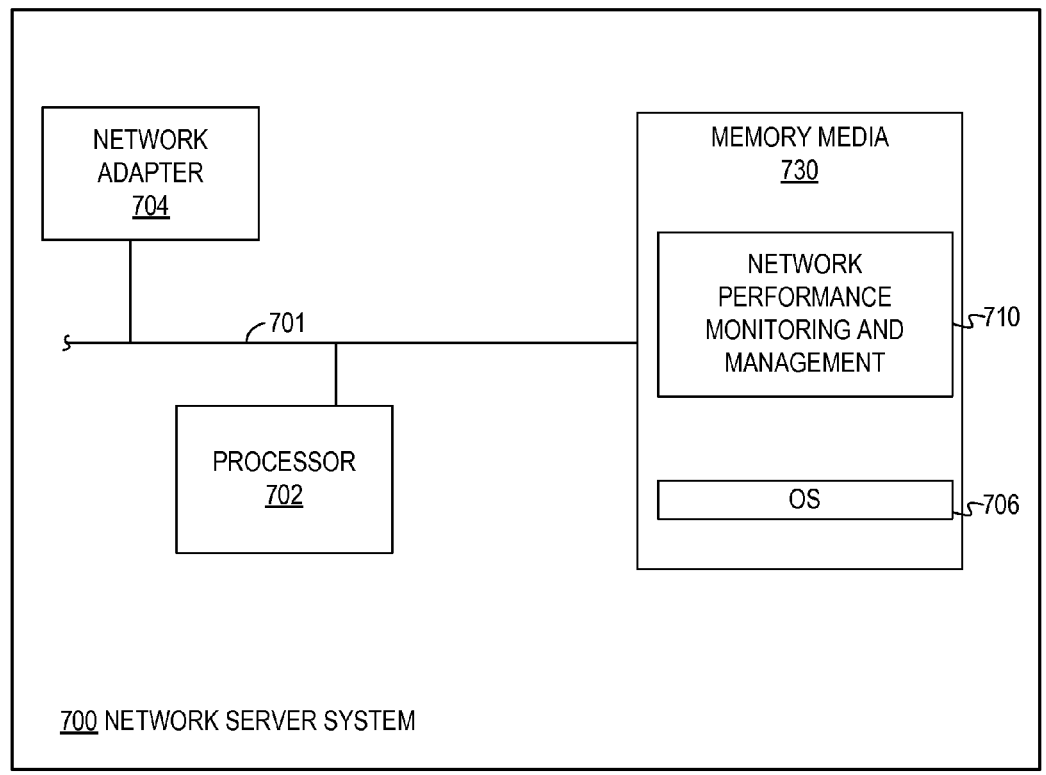
FIG. 7 is a block diagram of selected elements of an embodiment of a network server system.

Referring now to FIG. 7, a block diagram illustrating selected elements of an embodiment of network server system 700 is presented. In FIG. 7, network server system 700 represents an example embodiment of application server 150, which may operate in conjunction with database server 190 (see FIG. 1) to execute the methods and operations described herein.

In the embodiment depicted in FIG. 7, network server system 700 includes processor 702 coupled via shared bus 701 to storage media collectively identified as memory media 730. Network server system 700, as depicted in FIG. 7, further includes network adapter 704 that interfaces network server system 700 to switching network 140 and through which network server system 700 may communicate with other elements of MCDN 100 (see FIG. 1). In certain embodiments, network server system 700 may alternatively be located external to MCDN 100, such that network adapter 704 provides access to MCDN 100.

Memory media 730 encompasses persistent and volatile media, fixed and removable media, and magnetic and semiconductor media. Memory media 730 is operable to store instructions, data, or both. Memory media 730 as shown may include sets or sequences of instructions, namely, an operating system 706, and network performance monitoring and management 710. Operating system 706 may be a UNIX or UNIX-like operating system, a Windows® family operating system, or another suitable operating system. In some embodiments, memory media 730 is configured to store and execute instructions provided as services to client 120 by application server 150, as mentioned previously. It is noted that network performance monitoring and management 710 may execute the methods and operations described herein, such as method 600 (see FIG. 6) and/or method 500 (see FIG. 5), or other operations.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A network management method, comprising:
    receiving, by a network server in a multimedia network, an indication of impaired network performance from a particular network client of the multimedia network;
    identifying a network node coupled, via an access network, to a client group comprising a plurality of network clients including the particular network client;
    obtaining impairment data, including a value of an impairment parameter, from each of the plurality of network clients in the client group, wherein the impairment parameter indicates a number of re-initializations of a customer premises equipment device;
    ranking the plurality of network clients based on the impairment data;
    identifying, from the ranking, a candidate network client;
    performing diagnostics on the candidate network client; and
    determining, based on the diagnostics, whether the impaired network performance is attributable to an external source, wherein the external source is external to the multimedia network and electromagnetically coupled to the particular network client.

2. The method of claim 1, wherein the indication of impaired network performance includes a service request from a customer premises equipment to a network provider.

3. The method of claim 1, wherein the network node includes a digital subscriber line access multiplexer.

4. The method of claim 1, wherein the impaired network performance is associated with a digital subscriber line service provided to the particular network client via a galvanic loop from the network node.

5. The method of claim 1, wherein the candidate network client is a different client than the particular network client.

6. The method of claim 5, wherein performing the diagnostics includes determining whether the particular network client and the candidate network client share proximate network connections.

7. A network monitoring computer system, comprising:
    a processor having access to a storage medium including processor executable program instructions that, when executed by the processor, cause the processor to perform operations including:
        receiving, from a first network client, an indication of a network impairment;
        identifying a client group comprising a plurality of network clients sharing a network node with the first network client;
        obtaining, from each of the plurality of network clients in the client group, a value for a customer premises parameter;
        identifying selected network clients in the client group based, at least in part, on the customer premises parameter values;
        performing network diagnostics on the selected network clients to determine a predicted impairment source; and
        determining whether the predicted impairment source is electromagnetically coupled to the first network client;
    wherein the customer premises parameter is indicative of a number of re-initializations of a gateway associated with the respective network client.

8. The computer system of claim 7, wherein the network node is a digital subscriber line access multiplexer configured to provide digital subscriber line service to the plurality of network clients, and further wherein, the network is a multimedia content distribution network.

9. The computer system of claim 7, wherein identifying the selected network clients includes identifying a second network client included in the plurality of network clients as a probable contributor to the network impairment, wherein the second network client is different from the first distribution network client.

10. The computer system of claim 7, wherein identifying the selected network clients includes performing an operation selected from a group of operations comprising:
    identifying network clients exceeding a threshold value of the customer premises parameter; and
    identifying network clients having a value of the customer premises parameter within a particular percentile of all values of the customer premises parameter.

11. The computer system of claim 7, wherein identifying the selected network clients includes:
    ranking the plurality of network clients according to the customer premises parameter; and
    responsive to determining, based on the ranking, that the network node is operating normally, stopping the obtaining of values for the customer premises parameter.

12. The computer system of claim 7, wherein identifying the client group is performed responsive to detecting a network uplink associated with the first network client operating normally.

13. A non-transitory computer-readable memory, including processor executable instructions that, when executed by a processor, cause the processor to perform operations comprising:
    receiving, from a first network client, an indication of a network impairment;
    identifying a client group comprising a plurality of network clients sharing a network node with the first network client;
    obtaining, from each of the plurality of network clients in the client group, a value for a customer premises parameter;
    identifying selected network clients in the client group based, at least in part, on the customer premises parameter values;
    performing network diagnostics on the selected network clients to determine a predicted impairment source; and
    determining whether the predicted impairment source is electromagnetically coupled to the first network client;
    wherein the customer premises parameter is indicative of a number of re-initializations of a gateway associated with the respective network client.

14. The non-transitory computer readable medium of claim 13, wherein identifying the selected network clients includes performing an operation selected from a group of operations comprising:
  identifying network clients exceeding a threshold value of the customer premises parameter; and
  identifying network clients having a value of the customer premises parameter within a particular percentile of all values of the customer premises parameter.

15. The non-transitory computer readable medium of claim 13, wherein identifying the selected network clients includes:
  ranking the plurality of network clients according to the customer premises parameter; and
  responsive to determining, based on the ranking, that the network node is operating normally, stopping the obtaining of values for the customer premises parameter.

16. The non-transitory computer readable medium of claim 13, wherein
  identifying the client group is performed responsive to detecting a network uplink associated with the first network client operating normally.

* * * * *